United States Patent [19]
Barbier et al.

[11] 3,987,250
[45] Oct. 19, 1976

[54] DATA TRANSMISSION NETWORK WITH INDEPENDENT FRAME PHASE

[75] Inventors: Xavier N. Barbier, Plessis-Trevise; Jean M. Lachaise, Fresnes, both of France

[73] Assignees: Societe Anonyme de Telecommunications, Paris; ETA Ministry of Post and Telecomm. (Centre National d'Etudes des Telecomm.), Issy-les-Moulineaux, both of France

[22] Filed: July 11, 1975

[21] Appl. No.: 595,170

[30] Foreign Application Priority Data
Aug. 5, 1974 France .................. 74.27063

[52] U.S. Cl. .................. 179/15 BD; 179/15 BS
[51] Int. Cl.² ............................ H04J 3/08
[58] Field of Search ....... 179/15 BD, 15 BS, 15 AF, 179/15 BF, 15 AD

[56] References Cited
UNITED STATES PATENTS
3,109,897  11/1963  Carbrey .................. 179/15 AF
3,420,956  1/1969  Heightley .................. 179/15 AF
3,725,593  4/1973  Palombari .................. 179/15 BF Primary Examiner—David L. Stewart
Attorney, Agent, or Firm—Abraham A. Saffitz

[57] ABSTRACT

A time division digital transmission system in which data are transmitted in the form of pulses grouped in multiplex words in time slots forming a recurrent frame. The invention relates more particularly to facilities in transmission line station for sampling from or introducing into the frame data words occupying certain time intervals in the frame. Each station comprises at least a multiplexer, a demultiplexer and a reception time base for restoring from the incoming frames and their framing words the time intervals and addresses of the said incoming frames, so that the component channels can be multiplexed and demultiplexed. Each station further comprises a local time base capable of producing local frames having framing words and the rhythm of which is controlled by the incoming signals, but which is able to oscillate freely in the absence of such signals. A buffer store is alternatively controlled by the received signals and by the local time base, whereby the phase of the outcoming signals is controlled by the latter time base.

3 Claims, 6 Drawing Figures

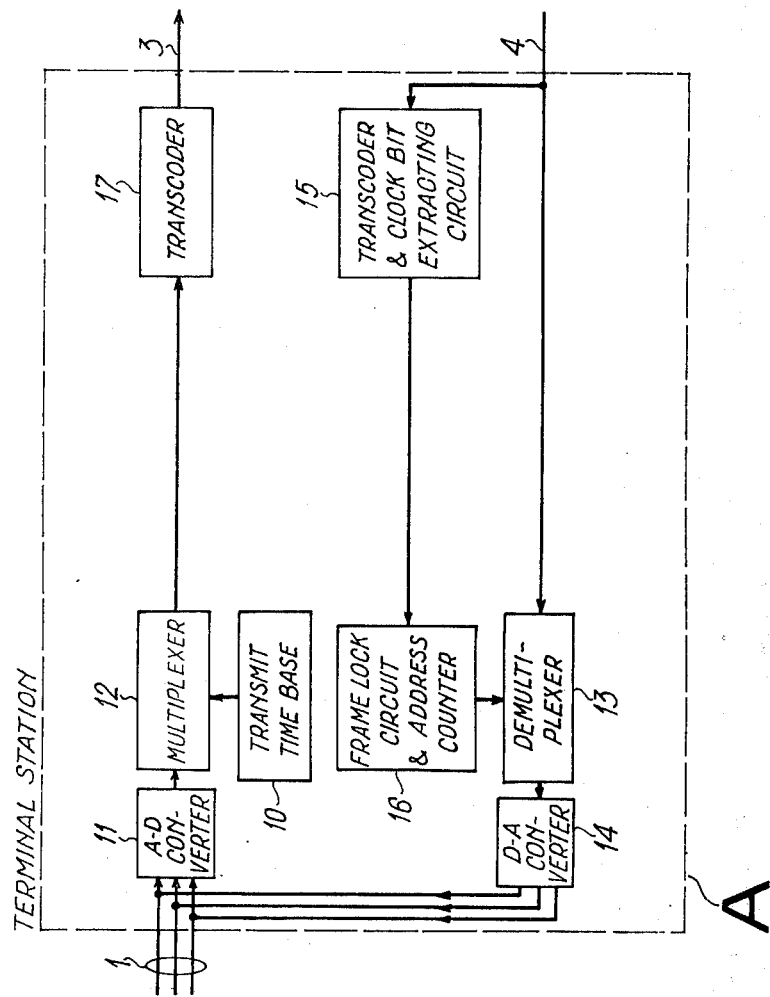

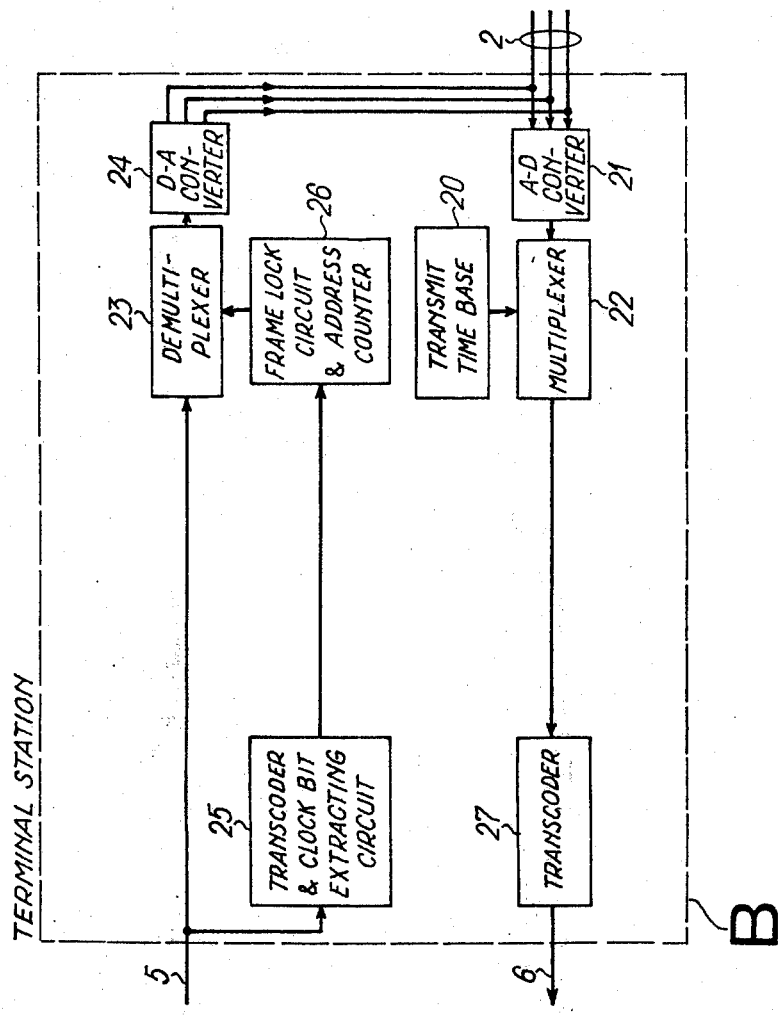

DATA TRANSMISSION NETWORK WITH INDEPENDENT FRAME PHASE

BACKGROUND OF THE INVENTION

1. Field of the Invention

This invention relates to a time division digital transmission system in which data are transmitted in the form of pulses grouped in multiplex words in time, in time slots forming a recurrent frame; the invention relates more particularly to facilities in transmission-line stations for sampling from and introducing into the word frame data words taking up particular time slots in the latter frame.

2. Description of the Prior Art

In known systems of the kind described, component digital signals which are either synchronous or which have been made synchronous by stuffing, e.g. signals at a rate of 64 kbits/sec, are time multiplexed in a transmitting station for transmission over a high-rate multiplex digital channel whose rate is e.g. 2.048 Mbits/sec if the multiplex digital channel arise from the multiplexing of 32 64 kbits/sec digital signals. The component digital signals occupy the time slots in the frame of the resulting digital signal and the origin of each frame is marked by an individual recognisable word called the framing word. The frames are demultiplexed at a receiving station to restore the component digital signals. At intermediate stations on the high-rate multiplex digital channel some component digital signals can be sampled from the incoming frame by demultiplexing or inserted in the outgoing frame by multiplexing.

Frame demultiplexing at terminal and intermediate stations is carried out by a reception time base which is synchronised by the incoming signals. The reception time base is a circuit which restores from the incoming frame the e.g. 3.9 μs pulses representing the word time slots and the e.g. 250 ns pulses separated by 250 ns intervals and representing the clock bits, the reception time base supplying the addresses from 0 to 31 for the time slots and from 1 to 8 for the clock bits, as is conventional for TN 1 multiplex channels.

3. Control Problem of the Prior Art

The reception time base is controlled by clock pulses taken from the incoming frame and is frame-synchronised by a framing circuit and ceases to operate when there are no incoming signals. Consequently, in the event of a breakdown upstream of an intermediate or terminal receiving station either at the actual transmission stations or somewhere along the chain of transmission, the reception time base of the receiving station concerned loses frame sync and stops. Synchronism must therefore be restored when normal signal transmission will take place again. If the receiving station is an intermediate station, this results in an interruption of the digital signal downstream of the receiving station.

SUMMARY OF THE INVENTION

According to the invention, each terminal and intermediate station of a multiplex link has, in addition to the conventional reception time base for restoring word and bit time slots, a local time base whose rhythm is synchronised with the incoming signals but which still operates in the absence of incoming signals and which is associated with a frame-word generator, and a buffer store is provided on the incoming multiplex channel before demultiplexing of the incoming signals and, where applicable, before multiplexing to form the outgoing signals, the buffer store being addressed for write-in by the reception time base and for read-out by the local time base. Consequently, and in contrast to what happened in the devices of the prior art, the reception time base is still phased up with the incoming frame, but in addition the incoming frame, after it has served to synchronise the reception time base, is phased up with the local time base, with storage of the incoming signals for a time equal to the difference between the operating rhythms of the reception time base and of the local time base.

BRIEF DESCRIPTION OF THE DRAWING

The invention will now be described in detail with reference to the accompanying drawings wherein:

FIGS. 1a, 1b, 1c show a prior art digital transmission system, and

DESCRIPTION OF THE PREFERRED EMBODIMENTS

Figure 1C:
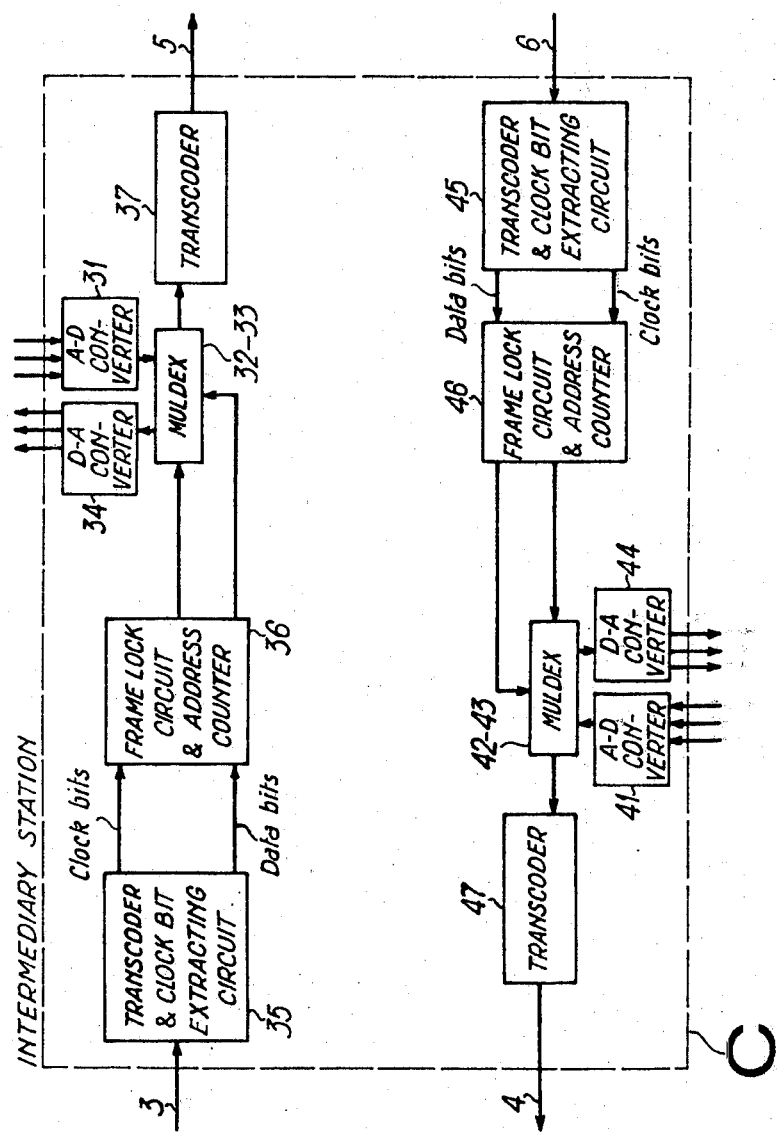

Referring first to FIGS. 1a, 1b and 1c, which show a prior art digital transmission system, there can be seen (FIG. 1a) a terminal station A, a terminal station B (FIG. 1b) and an intermediate station C (FIG. 1c). Terminal station A is connected to the intermediate station C by digital channels 3, 4, e.g. by 32 time-slot TN 1 channels at a 2.048 Mbits/rate, one such channel being used for each direction of transmission; the intermediate station C (FIG. 1c) is connected to the terminal station B (FIG. 1b) by one digital channel 5, 6 each for each of the two directions of transmission. The terminal stations A and B are connected to a number of digital lines 1 and analog lines 2, respectively.

The terminal stations A and B are identical. If the lines connected to them are analog lines, station A has an analog-to-digital converter 11 and station B has a similar converter 21, and station A has a digital-to-analog converter 14 and station B has a similar converter 24. No such converters are provided when the incoming lines to the stations are digital lines. The stations also have a respective multiplexer 12, 22 which define time slots and allocate words thereto, a respective demultiplexer 13, 23 collecting the consecutive words of the time slots, a respective transmission time base 10, 20, a respective output transcoding circuit 17, 27 which converts the code used in the stations into the code used for the resulting digital channel, and a respective input transcoding circuit 15, 25, which converts the code used on the resulting digital channel into the code used in the stations and which also serves to restore the distant clock — i.e. to sample the clock bits from the incoming multiplex signals. Such sampling can of course be provided by means of an electronic flywheel or of a pulse-controlled oscillator. The transcoding and clock bit sampling circuits 15, 25 are connected to framing and address-counting circuits 16, 26 respectively which supply the demultiplexer with the time slot addresses and the bit addresses. The system embodied by the circuits 15, 16 or 25, 26 is often wrongly called the reception time base or clock; unlike transmission time base, such circuits are passive circuits which are controlled by the incoming multiplex signals and which cease to operate when the flow of incoming digital signals ceases.

The intermediate station C (FIG. 1c) has the same circuits as the terminal stations except for the transmission time bases, the other ones being duplicated for both directions of transmission. The intermediate station therefore has:
- Analog-to digital converters 31, 41 and digital-to-analog converters 34, 44 if the lines connected to the stations are analog lines;
- Multiplexing circuits 32, 42 and demultiplexing circuits 33, 44 shown as two "muldexes" 32, 33 and 42, 43;
- The incoming transcoding and clock bit sampling circuits 35, 45;
- The framing and address counter circuits 36, 46; and
- The outgoing transcoding circuits 37, 47.

Clearly, the reception time bases are not independent clocks but are frequency and phase synchronised by the incoming digital signals. The outgoing signal frame is cophasal with the incoming signal frame. However, as explained in the opening part hereof, in the event of a breakdown, e.g. a breakdown in transmission at station A or a transmission fault on the multiplex channel 3, the reception time bases stop and loss synchronism so that the multiplexing and demultiplexing become impossible.

Figure 2A:
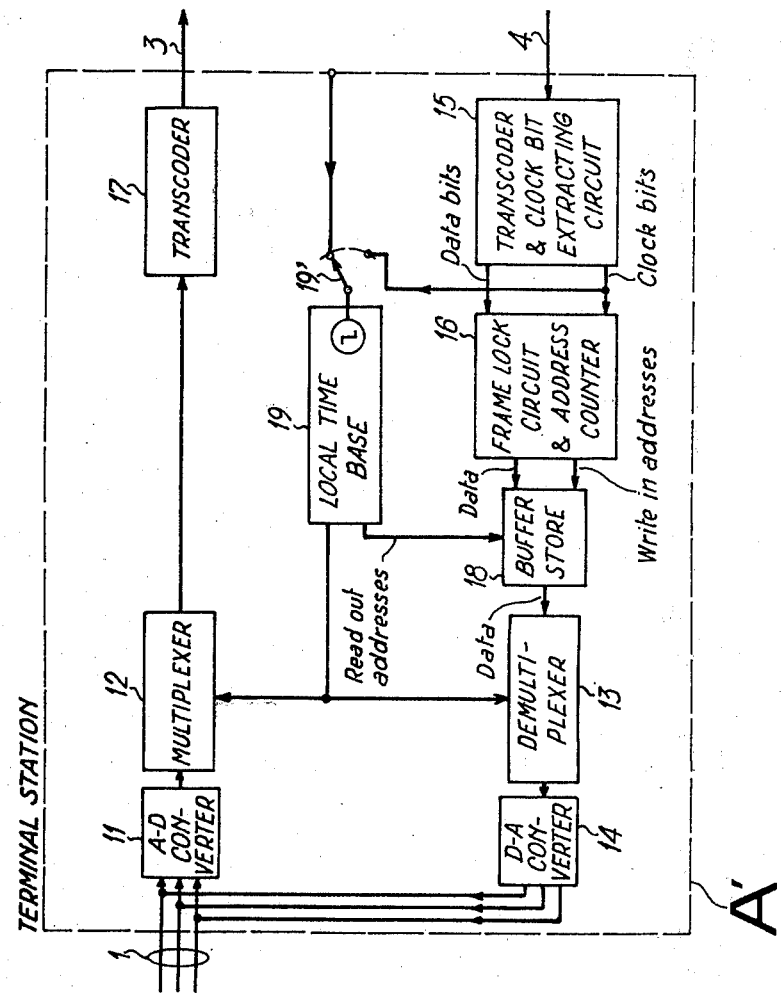
FIGS. 2a, 2b, 2c show a digital transmission system according to the invention.
Figure 2B:
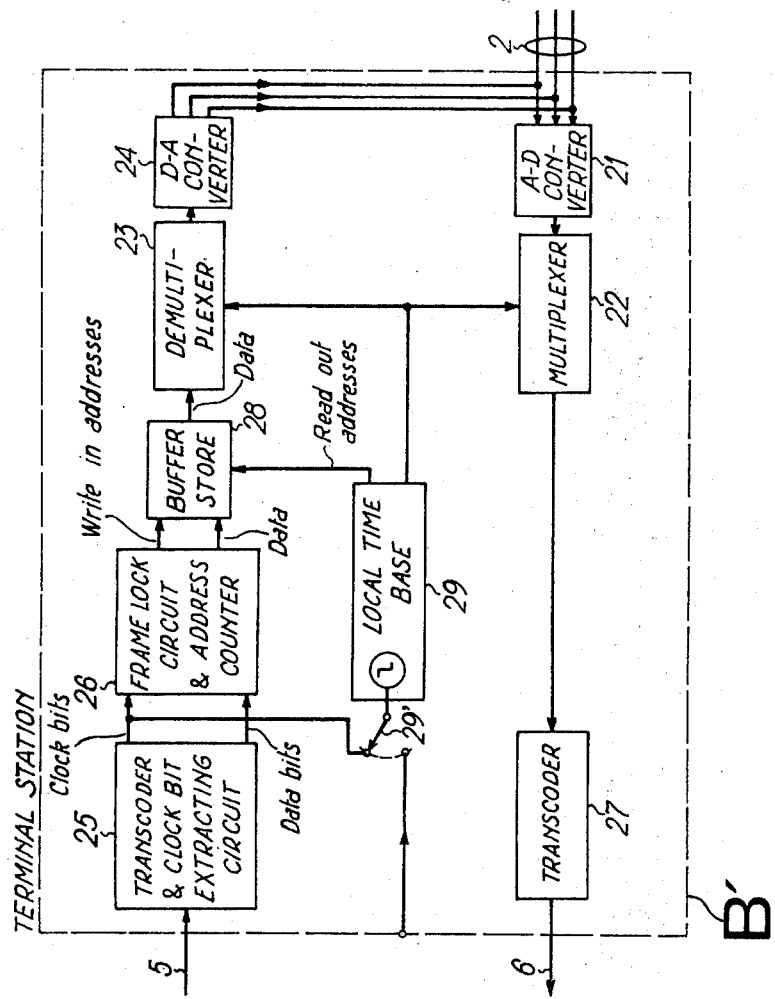
Figure 2C:
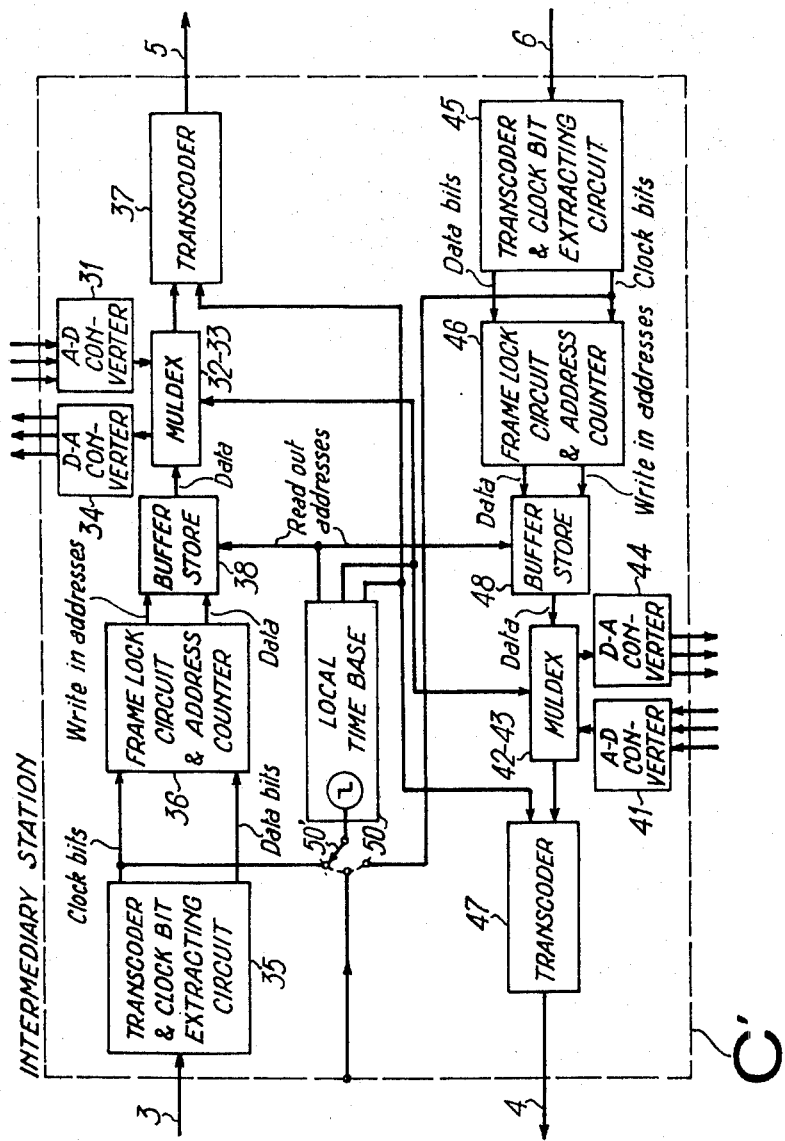

Referring now to FIGS. 2a, 2b and 2c, in the first place (FIG. 2c) to the intermediate station C', the latter has the analog-to-digital converters 31, 41, digital-to-analog converters 34, 44, multiplexers and demultiplexers shown as "muldexes" 32, 33 and 42, 43, transcoding and clock bit sampling circuits 35, 45, framing and address counter circuits 36, 46 and outgoing transcoding circuits 37, 47. Also provided, however, are a buffer store, 38, 48 respectively, and a local time base 50, of which there is only one in an intermediate station. The time base 50 is an active time base having an oscillator whose frequency is controlled by the incoming clock signals output by the circuit 35 or 45; consequently, the local time base 50 continues to operate even when there are no incoming signals, unlike the reception time bases of FIG. 1. The local time base 50 also has a framing signal generator.

As mentioned in the opening part hereof, the reception time embodied by the circuits 35, 36 or 45, 46 is phased up with the incoming frame, but in addition the latter is phased up with the local time base 50, the frequency thereof being controlled. To this end, the frame bits are stored in stores 38 and 48 for a time equal to the frame shift between the reception time base and the local time base. The stores 38, 48 can be addressable stores which can be addressed for write-in by the address counter circuit 36 and for read-out by the local time base 50. The stores 38, 48 can also take the form of a series shift register which outputs in series to a register stage controlled by an address signal measuring the phase difference between the reception time bases 35, 36 and the local time base 50.

Through the agency of a selector 50', control of the local time base 50 can be allotted as required to the signals entering the intermediate station in either of the two directions of transmission.

The terminal stations A', B' of FIGS. 2a and 2b differ from the stations A, B of FIGS. 1a and 1b only by the presence of the buffer store 18, 28 and of the local time base 19, 29 instead of the transmission time base. Unlike the transmission time bases 10, 20 of FIGS. 1a and 1b, the time bases 19, 29 are not independent time bases but are rhythmically synchronised time bases — i.e. they have an oscillator locked on the incoming signals. The frames for both directions of transmission are therefore phased up in the terminal stations, in contrast to what happens in prior art digital transmission systems.

When the signal transmitted from the station A' and received by the station C' is interrupted, the local time base is unaffected and the digital channels passing between C' and B' continue to be transmitted normally. When a signal reappears from the station A', the shift caused by the buffer store 38 is adjusted to the correct value for the received frame to be cophasal with the local time base and for communication to be restored between A' and C' without disturbing the connections between the stations C' and B'.

In a link, the local time base of one of the stations — either the terminal station or the intermediate station — is independent i.e., such time base is not synchronised by the incoming digital signal. The independent time base acts as a pilot in both directions of the link. The local time bases of all the other stations are synchronised with one of the two incoming digital signals.

The local time bases 19, 50, 29 may be arranged for synchronisation by a general clock or timing signal distributed by a distribution network; in this event, the selectors 19', 50', 29' are in their horizontal position.

The provision of a buffer store at every station has special advantages. It absorbs the irregularity of incoming signals and transmission time variations and limits disturbances in the event of loss of synchronisation.

What we claim is:

1. A digital transmission system comprising two terminal stations and at least one intermediate station between which words distributed in time slots of a frame are exchanged by way of digital channels arising from the multiplexing of component digital channels, each station of the system having at least one multiplexer and at least one demultiplexer and a reception time base for restoring from the incoming frames and their framing words the time slots and addresses of said incoming frames so that said component channels can be demultiplexed and multiplexed; each said station also having a local time base producing local frames having framing words, the rhythm of said local time base being controlled by the incoming signals but said local time base being able to oscillate freely in the absence of incoming signals; a buffer store on the incoming multiplex digital channel of an intermediate station; means for addressing said buffer store for write-in by said reception time base and for read-out by said local time base; and means for controlling said multiplexer and said demultiplexer by said local time base, so that said reception time base is phase-controlled by the frame of the incoming signals whereas the phase of the outgoing signal frame is determined by said local time base.

2. A digital transmission system according to claim 1, in which said intermediate station has a multiplexer and a demultiplexer and in which said local time base is controlled by the incoming signals corresponding to either of the two possible transmission directions and controls the two multiplexers and the two demultiplexers corresponding to one and the other of said two transmission directions.

3. A digital transmission system according to claim 1; in which said local time bases of the stations have their rhythm controlled by asynchronous clocks.

* * * * *